US012234657B2

United States Patent
Yin et al.

(10) Patent No.: US 12,234,657 B2
(45) Date of Patent: Feb. 25, 2025

(54) TRE ASSEMBLE PERMANENT COLUMN FORMWORK AND MANUFACTURING METHOD THEREOF

(71) Applicant: CHINA UNIVERSITY OF MINING AND TECHNOLOGY, Xuzhou (CN)

(72) Inventors: Shiping Yin, Xuzhou (CN); Zhangtao Peng, Xuzhou (CN); Xiuxian Li, Xuzhou (CN); Yuntao Hua, Xuzhou (CN); Xudong Ren, Xuzhou (CN); Yingde Zhao, Xuzhou (CN); Haofeng Long, Xuzhou (CN); Haonan Cong, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 850 days.

(21) Appl. No.: 17/435,029

(22) PCT Filed: Sep. 29, 2020

(86) PCT No.: PCT/CN2020/118604
§ 371 (c)(1),
(2) Date: Aug. 30, 2021

(87) PCT Pub. No.: WO2021/212750
PCT Pub. Date: Oct. 28, 2021

(65) Prior Publication Data
US 2022/0325542 A1 Oct. 13, 2022

(30) Foreign Application Priority Data

Apr. 21, 2020 (CN) .......................... 202010317159.1

(51) Int. Cl.
*E04G 13/02* (2006.01)
*B28B 11/24* (2006.01)

(52) U.S. Cl.
CPC .......... *E04G 13/021* (2013.01); *B28B 11/245* (2013.01)

(58) Field of Classification Search
None
See application file for complete search history.

(56) References Cited

U.S. PATENT DOCUMENTS 2,319,105 A * 5/1943 Billner .................... B28B 23/12
52/223.3
4,781,006 A * 11/1988 Haynes .................. E04B 1/215
52/601

(Continued)

FOREIGN PATENT DOCUMENTS

CN 102828578 A 12/2012
CN 107023164 A 8/2017

(Continued)

*Primary Examiner* — Gisele D Ford
(74) *Attorney, Agent, or Firm* — SOROKER AGMON NORDMAN PTE LTD

(57) ABSTRACT

The present invention discloses a TRC assemble permanent column formwork and a manufacturing method thereof, which belongs to the technical field of reinforced concrete building construction. The TRE assemble permanent column formwork comprises first panels, second panels, circumferential bolts, longitudinal bolts, nuts and gaskets; the formwork is manufactured from an engineered cementitious composite ECC and a woven fabric net; the first panels are used for assembling the column formwork at the two ends of a column, and the second panels are used for assembling the column formwork in the middle section of the column; the panels are provided with preformed bolt holes, and the bolt holes among the panels are corresponding to each other for bolt connections; the bolts include circumferential bolts and longitudinal bolts. The TRE permanent column formwork provided by the present invention can reduce material waste, labor cost, and project cost. Besides, the panels have advan- (Continued)

tages of easy and firm assembling, convenient transportation and low manufacturing cost, and the formwork has great application prospects.

5 Claims, 3 Drawing Sheets

(56) References Cited

U.S. PATENT DOCUMENTS

| | | | | |
|---|---|---|---|---|
| 8,505,244 | B2* | 8/2013 | Gomez | F03D 13/20 52/745.18 |
| 10,538,936 | B2* | 1/2020 | Knitl | F03D 13/20 |
| 2005/0067552 | A1* | 3/2005 | Penzkofer | E04G 9/08 249/23 |
| 2009/0025304 | A1* | 1/2009 | Irniger | E04H 12/12 52/843 |
| 2009/0232606 | A1* | 9/2009 | Penza | E04G 13/02 405/257 |
| 2013/0025229 | A1* | 1/2013 | Kapitza | F03D 13/20 264/263 |

FOREIGN PATENT DOCUMENTS

| | | |
|---|---|---|
| CN | 107060210 A | 8/2017 |
| CN | 111424971 A | 7/2020 |
| KR | 100516109 B1 | 9/2005 |
| WO | 2015088297 A1 | 6/2015 |

* cited by examiner (a)            (b)

(a)            (b)

TRE ASSEMBLE PERMANENT COLUMN FORMWORK AND MANUFACTURING METHOD THEREOF

TECHNICAL FIELD

The present invention relates to a TRE permanent column formwork and a manufacturing method thereof. The formwork is applicable to building structures such as industrial and civil building structures, marine structures and hydraulic structures, and belongs to the technical field of reinforced concrete construction.

BACKGROUND ART

Formworks are indispensable models for newly poured concrete molding, and can be categorized by material into steel formworks, wood formworks, bamboo plywood formworks and plastic board formworks. Such formworks generally have problems such as low reuse rate, high application cost, severe environmental impacts, and inconvenient disassembly and assembly. Therefore, assemble permanent formwork with environmental protection and durability is becoming a new direction of research and development.

New type TRC (Textile Reinforced Concrete) permanent formworks can solve the above problems of conventional wood formworks and steel formworks. TRC is formed by multiaxial woven fabric net and fine concrete in combination, and has properties of excellent load bearing, crack limitation, impermeability and corrosion resistance, as well as ability of self-healing from multiple cracking and microcracking. TRC permanent formworks are lightweight and convenient for construction, and can serve as components to bear a part of the load after poured and molded. However, the substrate of TRC has low ductility, and the assembling form is simple.

Textile Reinforced Ecc (TRE) is a new material combined by TRC and Engineered Cementitious Composite (ECC). ECC is a fiber-reinforced cementitious composite proposed in recent time on the basis of the principles of micromechanics and fracture mechanics, which has an outstanding strain hardening property and outstanding crack control ability. By utilizing ECC and TRC in combination, the ductility of TRC permanent formworks can be improved effectively.

Circular columns are one of the forms of frame columns in frame structures in China at present, which are molded by pouring with column formworks. In the construction of column formworks, staggered lapping is required for formwork supporting during construction to ensure that the column formworks are in a straight line in the vertical direction as a whole; otherwise the joint of column formworks without staggered lapping is a circular seam, the integrity and stability of the column formworks is poor, and a formwork displacement phenomenon may occur easily after pouring. In the prior art, column formworks connected by bolts have problems such as difficult to determine the positions of the bolt holes and the assembling process is complicated.

SUMMARY OF THE INVENTION

Object of the Invention: in order to solve the above problems, the object of the present invention is to provide a TRE assemble permanent column formwork that can be assembled easily to and jointed firmly and a manufacturing method thereof, so as to overcome the drawbacks in the prior art.

Technical Solution: the present invention discloses a TRE assemble permanent column formwork, which comprises first panels, second panels, circumferential bolts, longitudinal bolts, nuts and gaskets, wherein the first panels are used for assembling the column formwork at the two ends of a column, the second panels are used for assembling the column formwork in the middle section of the column, the panels are provided with preformed bolt holes at assembling positions, and the bolt holes among the panels are corresponding to each other; the first panel and the second panel are in an arc shape respectively; the first panel has a circular sector-shaped flat surface at the top end, a boss at the bottom end, a circumferential boss at the left end, and a groove at the right end to fitted with the circumferential boss; the top end and the bottom end of the second panel are provided with a groove respectively to fit with the boss at the bottom end of the first panel, the left end of the second panel is provided with a circumferential boss, and the right end of the second panel is provided with a groove to match with the circumferential boss; both the circumferential bolt and the longitudinal bolt comprise bolt heads and bolt rods at head end and tail end respectively, wherein the bolt rod of the circumferential bolt is arc, while the bolt rod of the longitudinal bolt is straight; the shape of the bolt head is a solid body formed by two semi-ellipsoidal surfaces angled with respect to each other and curved surfaces between the circumferences of the two semi-ellipsoidal surfaces; the major axes of the two semi-ellipsoidal surfaces are different from each other, the two ends of the bolt head have male threads, the semi-ellipsoidal surface of the bolt head with a shorter major axis is provided with female threads at the center, the bolt rod is connected with the bolt heads through threads, and the shape of the bolt hole is a groove to match with the bolt head; the first panel and the second panel are manufactured from an engineered cementitious composite ECC and a woven fabric net, the woven fabric net is arranged at the central part of the panel.

The woven fabric net is arranged to have arc corresponding to the panel, and is at the same distance from the inner diameter and the outer diameter of the column formwork.

A single column comprises 8 first panels and 4N second panels, wherein N is a natural number greater than or equal to 1.

All of the bolts, nuts and gaskets are made of FRP material.

The FRP material of the bolts may be any of AFRP, BFRP, CFRP and GFRP. Bolts made of a FRP material have effectively improved chloride corrosion resistance and can enhance corrosion resistance of the permanent formworks.

A method for manufacturing the panels of a TRE assemble permanent column formwork comprises the following steps:

step 1: determining the dimensions of TRE panels to facilitate transportation according to the dimensions of the column to be poured;

step 2: selecting a laminated wood formwork as a mold for panel forming, and supporting the wood formwork according to the dimensions and shapes of the panels, wherein there are two types of wood formworks in shape used for fabricating two types of panels, and the upper part of the mold employs an overturn and hinged mold opening/closing means, and lateral supporting is required when the wood formwork is supported to prevent lateral deformation during ECC pouring;

step 3: cutting a rigid plastic foam board according to the dimensions of a side formwork of the wood formwork, bonding the rigid plastic foam board to the inner side of the side formwork, drilling holes in the column formwork at positions where bolt holes need to be reserved to mount the prefabricated PVC plastic hole-forming model, wherein the hole-forming model is divided into two types: prefabricated circumferential PVC plastic hole-forming models and prefabricated longitudinal PVC plastic hole-forming models, for preforming circumferential bolt holes and longitudinal bolt holes required for the panel respectively;

step 4: applying a mold releasing agent inside the mold to facilitate removal of the permanent formwork;

step 5: cutting a woven fabric net according to the dimensions and shape of the mold: wherein the woven fabric net is woven from several types of fibers selected from carbon fibers, aramid fibers, alkali-resistant glass fibers, basalt fibers, polyethylene fibers and polyvinyl alcohol fibers; the woven fabric net is woven from different types of fibers in combination in the weft direction and warp direction;

step 6: cutting steel wire mesh according to the required dimensions and shape of the woven fabric net, attaching the woven fabric net to the steel wire mesh, and then uniformly applying epoxy resin coating solution on the woven fabric net with a brush while paying attention to the uniformity of application and avoiding any missing coating, so that the connection between the fibers of the woven fabric net is closer to prevent any deformation of the woven fabric net during ECC pouring;

step 7: treating the woven fabric net by sand blasting before the epoxy resin coating is cured, the sand used for sand blasting is silica sand;

step 8: air-drying the woven fabric net in a dry and ventilated environment;

step 9: mounting the woven fabric net on the central part of the mold;

step 10: closing the overturn and hinged mold opening/closing means on the top part of the mold, wherein the panel employs a horizontal pouring method, which leaves only one notch for material pouring, to ensure no deformation and no grout leakage during continuous production;

step 11: pouring ECC, ECC has good workability and fluidity, vibrating the mold once when about ¼ pouring work is completed to expel air bubbles in the ECC and improve the compactness of the ECC, repeating the above-mentioned process for several times until the entire mold is fully filled with the ECC, then opening the overturn and hinged mold opening/closing means and carrying out a surface finishing procedure;

step 12: keeping the mold in appropriate humidity and temperature conditions for curing for 28 days after the pouring is completed; finally, removing the mold and entering into the stacking stage.

The epoxy resin coating solution used in the step 6 is prepared with the following method: mixing epoxy resin, a curing agent and a diluent in a ratio of 2:2:1 intensively to a homogeneous state, so as to obtain the epoxy resin coating solution.

The ECC used in the step 11 is prepared with the following method:

step 1: preparing the following materials: 442 kg/m$^3$ P.O42.5 Portland cement, 821 kg/n Grade I coal ash, 455 kg/m$^3$ quartz sand with 140-280-mesh, 9.7 kg/m$^3$ high-performance water reducer Sika poly-carboxylic acid with the water reducing rate of 30%, 0.63 kg/m$^3$ thickener, 354 kg/m$^3$ tap water and chopped fibers in volume fraction of 2%;

step 2: pouring the cement, quartz sand, coal ash and thickener into an agitator and agitating for 2-3 min, pouring tap water with dissolved high-performance water reducer Sika poly-carboxylic acid into the agitator and agitating for 6-8 min, then continually adding the chopped fibers uniformly, after all of the fibers are added into the agitator, agitating further for 3-5 min; thus, the preparation of the ECC is completed.

Furthermore, the appropriate curing conditions in the step 12 are: temperature: (20±1) ° C., humidity: ≥95%.

Furthermore, the chopped fibers are mixed from one or more types of non-metal fibers that are different from each other in performance, including basalt fibers, polypropylene fibers, polyvinyl alcohol fibers, polyethylene fibers, carbon fibers, and glass fibers, etc.

Beneficial effects: the present invention discloses a TRE assemble permanent column to formwork and a manufacturing method thereof. Panels required for assembly can be obtained through the above-mentioned manufacturing process, and the panels have the advantages of easy and firm assembling, convenient transportation and low manufacturing cost, and the column formwork have great development prospects. Compared with the prior art, the present invention attains the following beneficial effects:

(1) The conventional wood formworks and steel formworks are replaced by using permanent formworks. On one hand, the use of permanent formworks can simplify the construction procedure, save manpower, and greatly shorten the construction period; on the other hand, the use of permanent formworks can reduce material waste, reduce labor cost, improve the durability of the building, and reduce the total project cost.

(2) The level of prefabrication of the structure is improved. Panels required for assembly are prefabricated before construction, which can be assembled and used conveniently, and achieve high operability.

(3) The conventional staggered assembly is replaced by novel prefabricated panels. For columns in height higher than 3 m, it is no longer necessary to use staggered lapping for formwork supporting to ensure that the formworks are in a straight line in the vertical direction; thus, the assembling process is effectively simplified.

(4) All of the bolts, nuts and gaskets are made of FRP material. The FRP is a fiber reinforced composite and has the characteristics of light weight, high tensile strength and high corrosion resistance property. The corrosion resistance property is mainly embodied in high chloride corrosion resistance. In view of the lack of river sand resources and the requirement of offshore island construction, concrete prepared with sea water and sea sand is gradually replacing the existing concrete. Therefore, the use of FRP bolts is in line with the development trend.

(5) Fine concrete is replaced by ECC, i.e., TRC is replaced by TRE. Compared with TRC, the substrate of TRE has higher ductility; therefore, the width of cracks generated in the columns during use can be controlled effectively, and the service performance of the structures can be improved.

(6) The column formwork assembling technique is novel, easy to operate, can achieve firm assembly, is helpful for stacking management, and has high practicability.

EMBODIMENTS

Hereunder the present invention will be further described with reference to the accompanying drawings.

Figure 1:
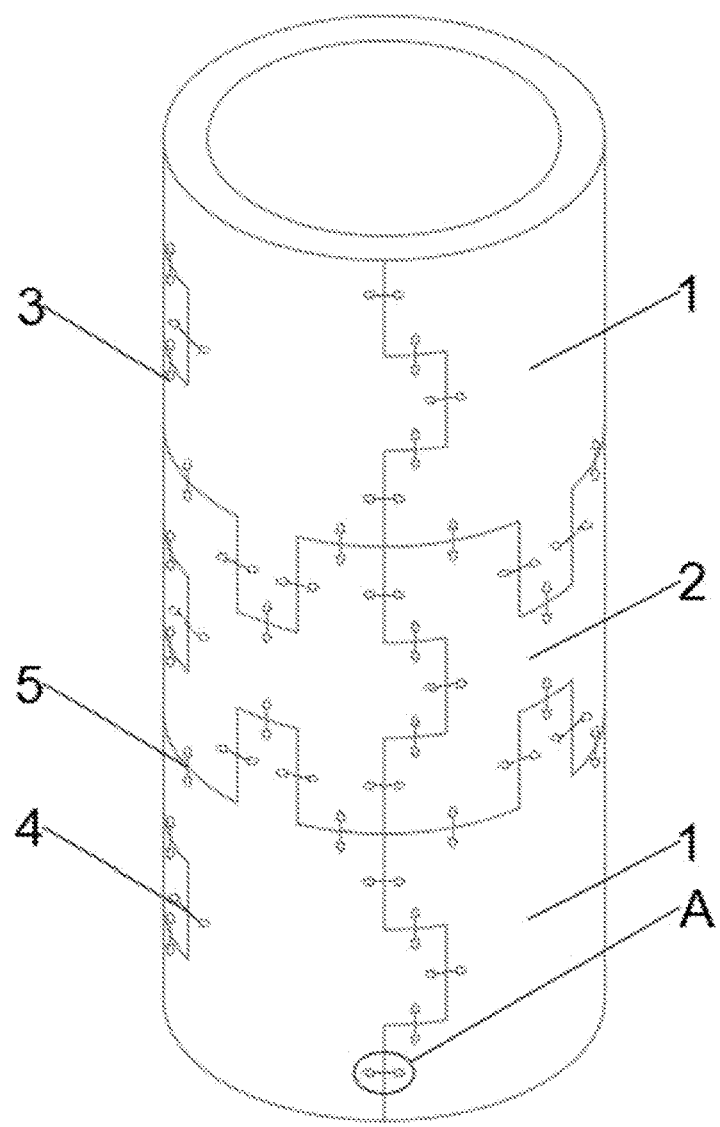
FIG. 1 is an overall schematic view of the assembled structure of the TRE assemble permanent column formwork according to the present invention.
Figure 2:
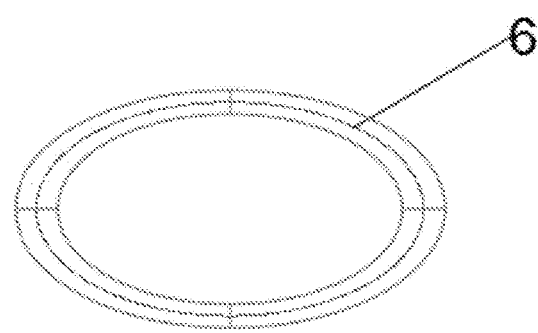
FIG. 2 is a top view of the assembled structure of the TRE assemble permanent column formwork according to the present invention.
Figure 3:
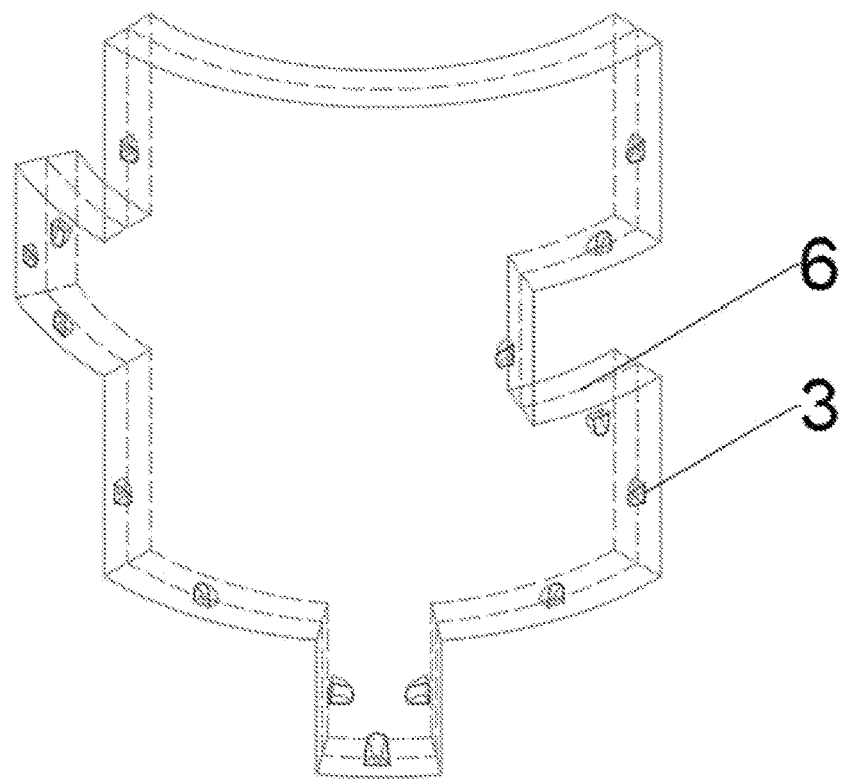
FIG. 3 is an isometric view of the structure of the first panel in the TRE according to the present invention.
Figure 4:
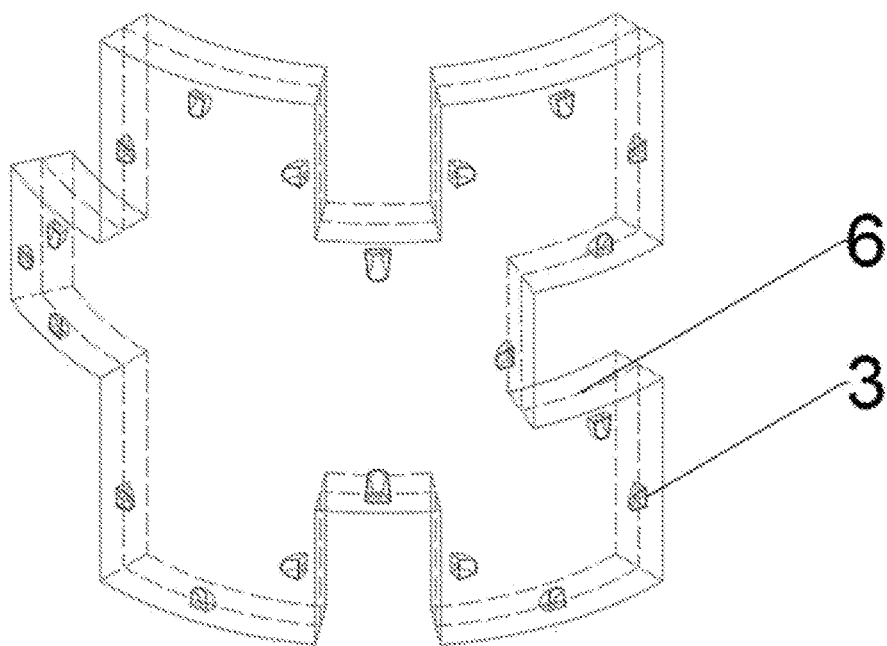
FIG. 4 is an isometric view of the structure of the second panel in the TRE according to the present invention.
Figure 5:
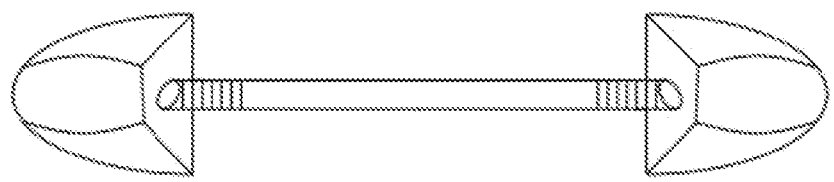
FIG. 5 is a partially enlarged view of the part A in FIG. 1.
Figure 7:
FIG. 7(a) is a plan view of the circumferential bolt.
FIG. 7(b) is a plan view of the longitudinal bolt.

As shown in FIG. 1, the present invention discloses a TRE assemble permanent column formwork, which comprises first panels 1, second panels 2, circumferential bolts 4, longitudinal bolts 5, nuts and gaskets. FIG. 2 is a top view of the TRE assemble permanent column formwork. The first panels 1 are used for assembling the column formwork at the two ends of a column, the second panels 2 are used for assembling the column formwork in the middle section of the column, the panels are provided with preformed bolt holes 3 at assembling positions, and the bolt holes among the panels are corresponding to each other; the first panels 1 and the second panels 2 are provided with arc respectively; the first panel 1 has a circular sector-shaped flat surface at the top end, the bottom end of the first panel 1 is provided with a boss, the left end of the first panel 1 is provided with a circumferential boss, and the right end of the first panel 1 is provided with a groove to be fitted with the circumferential boss; as shown in FIG. 3; the second panel 2 has a groove at the top end and the bottom end respectively to be fitted with the boss at the bottom end of the first panel 1, the left end of the second panel 2 is provided with a circumferential boss, and the right end of the second panel 2 is provided with a groove to be fitted with the circumferential to boss, as shown in FIG. 4; both the circumferential bolt 4 and the longitudinal bolt 5 comprise bolt heads and bolt rods at the head end and at the tail end, as shown in FIG. 5, the bolt rod of the circumferential bolt 4 is in an arc shape, while the bolt rod of the longitudinal bolt 5 is a straight rod, and the bolt head is a solid body formed by two semi-elliptical surfaces angled with respect to each other and curved surfaces between the circumferences of the two semi-elliptical surfaces, and the major axes of the two semi-elliptical surfaces are different from each other; the two ends of the bolt head are provided with male threads; the circumferential bolt rod, longitudinal bolt rod and corresponding nuts are shown in FIG. 7(a) and FIG. 7(b); the semi-elliptical surface of the bolt head with a shorter major axis is provided with female threads at the central part, the bolt rod is connected with the bolt head through threads, and the shape of the bolt hole is a groove to be fitted with the bolt head. The first panel 1 and the second panel 2 are manufactured from an engineered cementitious composite ECC and a woven fabric net 6, and the woven fabric net 6 is arranged on the central part of the panel, is in an arc shape corresponding to the panel and at the same distance from the inner diameter and outer diameter of the column formwork.

A single column comprises 8 first panels and 4N second panels, wherein N is a natural number greater than or equal to 1. All of the bolts, nuts and gaskets are made of FRP material. The FRP material of the bolts may be any of AFRP. BFRP. CFRP and GFRP. Bolts made of a FRP material have effectively improved chloride corrosion resistance and can enhance corrosion resistance of the permanent formworks.

Figure 6:
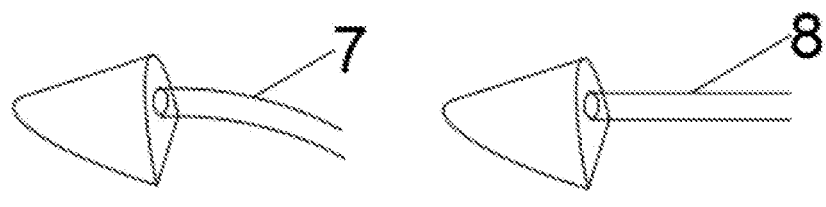
FIG. 6(a) is an isometric view of the prefabricated circumferential PVC plastic hole-forming model.
FIG. 6(b) is an isometric view of the prefabricated longitudinal PVC plastic hole-forming model.

A method for manufacturing the panels of a TRE assemble permanent column formwork comprises the following steps:

step 1: determining the dimensions of TRE panels to facilitate transportation according to the dimensions of the column to be poured;

step 2: selecting a laminated wood formwork as a mold for panel forming, and supporting the wood formwork according to the dimensions and shapes of the panels, wherein there are two types of wood formworks in shape used for fabricating two types of panels, and the upper part of the mold employs an overturn and hinged mold opening/closing means, and lateral supporting is required when the wood formwork is supported to prevent lateral deformation during ECC pouring:

step 3: cutting a rigid plastic foam board according to the dimensions of a side formwork of the wood formwork, bonding the rigid plastic foam board to the inner side of the side formwork, drilling holes in the column formwork at positions where bolt holes need to be reserved to mount the prefabricated PVC plastic hole-forming model, wherein the hole-forming model is divided into two types: prefabricated circumferential PVC plastic hole-forming models 7 and prefabricated to longitudinal PVC plastic hole-forming models 8, as shown in FIGS. 6(a) and 6(b), for preforming circumferential and longitudinal bolt holes required for the panels respectively;

step 4: applying a mold releasing agent inside the mold to facilitate removal of the permanent formwork;

step 5: cutting a woven fabric net according to the dimensions and shape of the mold; wherein is the woven fabric net is woven from several types of fibers selected from carbon fibers, aramid fibers, alkali-resistant glass fibers, basalt fibers, polyethylene fibers and polyvinyl alcohol fibers; the woven fabric net is woven from different types of fibers in combination in the weft direction and warp direction;

step 6: cutting steel wire mesh according to the required dimensions and shape of the woven fabric net, attaching the woven fabric net to the steel wire mesh, and then uniformly applying epoxy resin coating solution on the woven fabric net with a brush while paying attention to the uniformity of application and avoiding any missing coating, so that the connection between the fibers of the woven fabric net is closer to prevent any deformation of the woven fabric net during ECC pouring; the epoxy resin coating solution is prepared with the following method: mixing epoxy resin, a curing agent, and a diluent in a ratio of 2:2:1 intensively to a homogeneous state in a closed environment, so as to obtain the epoxy resin coating solution.

step 7; treating the woven fabric net by sand blasting before the epoxy resin coating is cured, the sand used for sand blasting is silica sand;

step 8: air-drying the woven fabric net in a dry and ventilated environment;

step 9: mounting the woven fabric net on the central part of the mold;

step 10: closing the overturn and hinged mold opening/closing means on the top part of the mold, wherein the panel employs a horizontal pouring method, and leaves only one notch for material pouring, to ensure no deformation, close fitting and no grout leakage during continuous production;

step 11: pouring ECC, which has good workability and fluidity, vibrating the mold once when about ¼ pouring work is completed to expel air bubbles in the ECC and improve the compactness of the ECC, repeating the above-mentioned process for several times until the entire mold is fully filled with the ECC, then opening the overturn and hinged mold opening/closing means and carrying out a surface finishing procedure;

step 12: keeping the mold in appropriate humidity and temperature conditions for curing for 28 days after the pouring is completed; finally, removing the mold, and entering into stacking stage, piling up the modes; the appropriate curing conditions are: temperature: (20±1)° C., humidity: ≥95%.

The ECC used in the step 11 is prepared with the following method:

step 1: preparing the following materials: 442 kg/m³ P.O42.5 Portland cement, 821 kg/m³ Grade I coal ash, 455 kg/m³ 140-280-mesh quartz sand, 9.7 kg/m³ high-performance water reducer Sika poly-carboxylic acid with the water reducing rate of 30%, 0.63 kg/m³ thickener, 354 kg/m³ tap water and chopped fibers in volume fraction of 2%;

step 2: pouring the cement, quartz sand, coal ash, and thickener into an agitator and agitating for 2-3 min., pouring tap water with dissolved high-performance water reducer Sika poly-carboxylic acid into the agitator and agitating for 6-8 min, then continually adding the chopped fibers uniformly, after all of the fibers are added into the agitator, agitating further for 3-5 min; thus, the preparation of the ECC is completed: wherein the chopped fibers are mixed from one or more types of non-metal fibers that are different from each other in performance, including basalt fibers, polypropylene fibers, polyvinyl alcohol fibers, polyethylene fibers, carbon fibers, and glass fibers, etc.

The invention claimed is:

1. A TRE assemble permanent column formwork, comprising first panels (1), second panels (2), circumferential bolts (4), longitudinal bolts (5), nuts and gaskets, wherein the first panels (1) are used for assembling the column formwork at the two ends of a column, the second panels (2) are used for assembling the column formwork in the middle section of the column, the panels are provided with preformed bolt holes (3) at assembling positions, and the bolt holes among the panels are corresponding to each other; the first panel (1) and the second panel (2) are in an arc shape respectively; the first panel (1) has a circular sector-shaped flat surface at the top end, a bottom end of the first panel (1) is provided with a boss, a left end of the first panel (1) is provided with a circumferential boss, and a right end of the first panel (1) is provided with a groove to be fitted with the circumferential boss; the second panel (2) has a groove at the top end and at the bottom end respectively to be fitted with the boss at the bottom end of the first panel (1), a left end of the second panel (2) is provided with a circumferential boss, and a right end of the second panel (2) is provided with a groove to be fitted with the circumferential boss; both the circumferential bolt (4) and the longitudinal bolt (5) comprise bolt heads and bolt rods at head end and at the tail end wherein the bolt rod of the circumferential bolt (4) is arc, while the bolt rod of the longitudinal bolt (5) is straight; the shape of the bolt head is a solid body formed by two semi-ellipsoidal surfaces angled with respect to each other and curved surfaces between the circumferences of the two semi-ellipsoidal surfaces; the major axes of the two semi-ellipsoidal surfaces are different from each other, the two ends of the bolt head have male threads, the semi-ellipsoidal surface of the bolt head with a shorter major axis is provided with female threads at the center, the bolt rod is connected with the bolt heads through threads, and the shape of the bolt holes is a groove to be fitted with the bolt head; the first panel (1) and the second panel (2) are manufactured from an engineered cementitious composite ECC and a woven fabric net (6), the woven fabric net (6) is arranged at the central part of the panel.

2. The TRE assemble permanent column formwork according to claim 1, wherein the woven fabric net (6) is in an arc shape corresponding to the panel, and is at the same distance from the inner diameter and the outer diameter of the column formwork.

3. The TRE assemble permanent column formwork according to claim 2, wherein a single column comprises 8 first panels and 4N second panels, wherein N is a natural number greater than or equal to 1.

4. The TRE assemble permanent column formwork according to claim 1, wherein all of the bolts, nuts and gaskets are made of FRP material.

5. The TRE assemble permanent column formwork according to claim 4, wherein the FRP material of the bolts may be any of AFRP, BFRP, CFRP and GFRP.

* * * * *